Sept. 12, 1939. G. E. SPEER 2,173,027
BAIT HOLDER
Filed Sept. 26, 1938
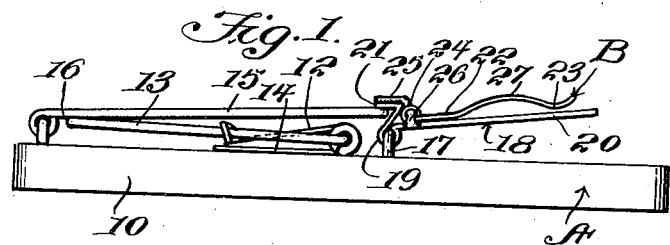
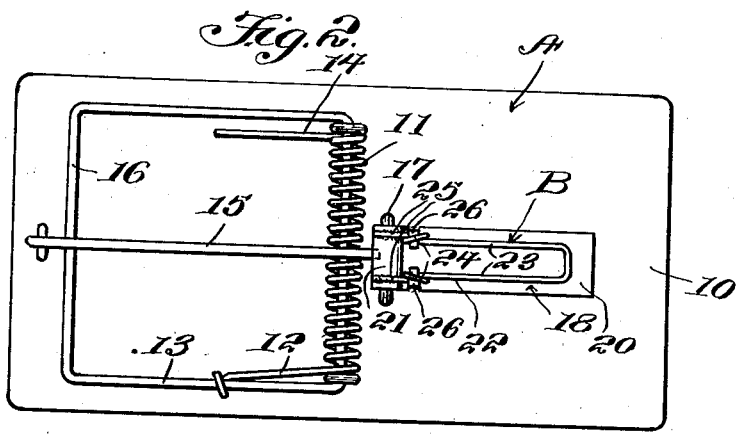
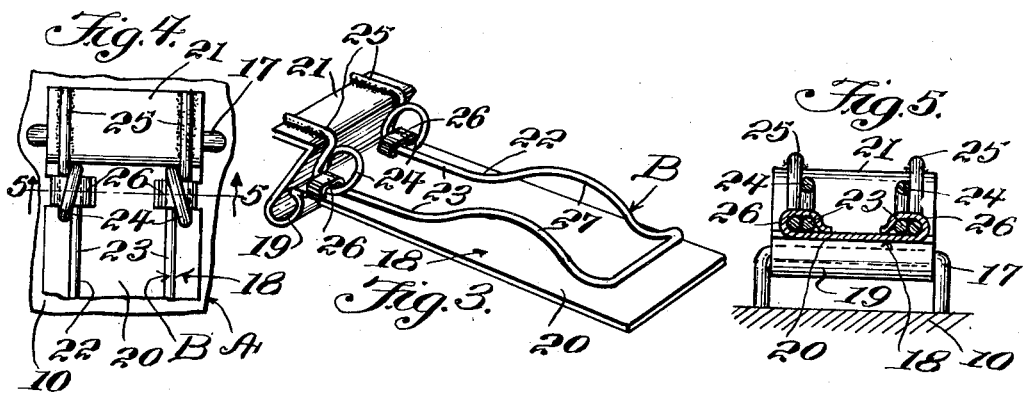
Gilbert E. Speer
INVENTOR
BY Victor J. Evans & Co.
ATTORNEYS
J. L. Wright
WITNESS Patented Sept. 12, 1939

2,173,027

UNITED STATES PATENT OFFICE 2,173,027

BAIT HOLDER

Gilbert E. Speer, Columbia Falls, Mont.

Application September 26, 1938, Serial No. 231,803

1 Claim. (Cl. 43—81)

The invention relates to a bait holder and more particularly to a rodent trap having a bait holder.

The primary object of the invention is the provision of a holder of this character, wherein the trap, that is, the spring type commonly used by householders for the catching of mice and rats on the premises, is assured of firmly holding bait so that it will stay on the trap long enough to catch a number of mice or rats and thus saving the trouble of baiting the trap every time it is reset.

Another object of the invention is the provision of a holder of this character, wherein the rodent will be retarded from stealing the bait without getting caught in the trap.

A further object of the invention is the provision of a trap of this character, wherein the trigger for the catching spring of the trap carries the bait holder and the latter makes secure the bait upon the trigger so that it can not be taken therefrom without catching the mouse or rat, the holder being of novel construction and also novel in the attachment thereof to the trigger.

A further object of the invention is the provision of a bait holder of this character, which is simple in its construction, thoroughly reliable and efficient in operation, assuring the easy application of bait to a trap, the retention of the bait thereon for an extended period of time, strong, durable and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a side elevation of a trap showing the bait holder constructed in accordance with the invention applied.

Figure 2 is a top plan view thereof.

Figure 3 is a perspective view of the trigger of the trap showing the bait holder mounted therewith.

Figure 4 is a fragmentary enlarged detail plan view of the trigger and holder.

Figure 5 is a sectional view taken on the line 5—5 of Figure 4 looking in the direction of the arrows.

Similar reference characters indicate corresponding parts throughout the several views in the drawing.

Referring to the drawing in detail, A designates generally the trap and B the bait holder, respectively, the trap, as is conventional, comprises a base 10, in this instance of substantially rectangular shape, being a flat slab. On this base is pivotally mounted the usual coiled spring 11 having an arm 12 extending longitudinally of the trap adapted to engage one side of a stiff wire trapping or catching frame 13. The other end 14 of this wire rests upon the base 10. A round lever 15 formed of stiff wire is mounted on one end of the base 10 and is adapted to bear against the cross bar 16 of the frame 13 to hold the same against undesired movement when the spring 11 is placed in tension by turning the frame back under the lever 15. This is conventional.

Hinged to the base 10, as at 17, at right angles to the spring 11 and beyond the lever 15 is a trigger or treadle 18 made from a strip of metal having bent therein a pintle sleeve 19 for completing the hinge connection 17 thereof with the base 10. This trigger or treadle 18 has projecting lengthwise thereof a plate 20 while at the inner end of this plate is an upstanding latching ear 21 engageable with the free end of the lever 15 when holding the frame 13 under tension when turned back under the lever 15.

Carried on the plate 20 is an inherently resilient substantially U-shaped bait holder 22 having in its side limbs 23 tensioning coils 24 and these side limbs terminate in ends 25 overhanging the latching ear 21 while engaged in the coils 24 are retaining tongues 26 cut and bent from the opposite longer sides of the plate 20. In this manner the bait holder is fixed to and carried by the trigger or treadle.

The side limbs of the bait holder 22 have upward bulges 27 giving clearances for bait when clamped upon the plate 20 beneath the holder 22 and the springy qualities of this holder will retain the bait upon the treadle or trigger for an extended period of time.

The tongues 26 cut and bent from the plate 20 are opposite each other and are bent inwardly through the coils 24 of the holder 22 thus fixedly maintaining the bait holder upon the trigger or treadle.

What is claimed is:

A bait holder for a spring type trap having a spring-controlled trap bar and a lever adapted to bear against the bar and hold the same against undesired movement, comprising a springy substantially U-shaped member, a trigger engageable with the lever and carrying the said member, coils bent from the member, means forming a part of the trigger and engageable with the coils for holding the member fixed to said trigger, and ends on said member contacting with the trigger for holding the member under tension and urging it in the direction of the trigger.

GILBERT E. SPEER.